(12) United States Patent
Lee et al.

(10) Patent No.: US 10,127,427 B2
(45) Date of Patent: Nov. 13, 2018

(54) ON-SCREEN FINGERPRINT SENSOR AND ELECTRONIC DEVICE INCLUDING THE SAME

(71) Applicant: SAMSUNG ELECTRONICS CO., LTD., Suwon-si (KR)

(72) Inventors: Byungkyu Lee, Seoul (KR); Seokwhan Chung, Hwaseong-si (KR); Daekun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/375,323

(22) Filed: Dec. 12, 2016

(65) Prior Publication Data

US 2017/0316249 A1 Nov. 2, 2017

(30) Foreign Application Priority Data

Apr. 29, 2016 (KR) .................. 10-2016-0053544

(51) Int. Cl.
*G06K 9/00* (2006.01)
*G06F 3/044* (2006.01)

(52) U.S. Cl.
CPC ......... *G06K 9/00053* (2013.01); *G06F 3/044* (2013.01); *G06K 9/0002* (2013.01); *G06K 9/00087* (2013.01); *G06F 2203/0338* (2013.01)

(58) Field of Classification Search
CPC ............. G06K 9/0002; G06K 9/00053; G06K 9/00087; G06F 3/044
USPC .................. 382/124; 345/156, 173
See application file for complete search history.

(56) References Cited

U.S. PATENT DOCUMENTS

| | | | |
|---|---|---|---|
| 7,920,130 B2 | 4/2011 | Tien | |
| 8,743,082 B2 | 6/2014 | Ganapathi et al. | |
| 9,781,853 B1* | 10/2017 | Witmer | H05K 7/12 |
| 2009/0021487 A1 | 1/2009 | Tien | |
| 2011/0102569 A1 | 5/2011 | Erhart | |
| 2013/0135247 A1 | 5/2013 | Na et al. | |
| 2013/0265137 A1 | 10/2013 | Nelson et al. | |
| 2015/0036065 A1 | 2/2015 | Yousefpor et al. | |
| 2015/0122625 A1* | 5/2015 | Seo | G06F 3/044 200/5 R |
| 2015/0177884 A1 | 6/2015 | Han | |
| 2016/0370939 A1* | 12/2016 | Guo | G06F 3/0418 |
| 2017/0285778 A1* | 10/2017 | Liang | G06K 9/00006 |

FOREIGN PATENT DOCUMENTS

| | | |
|---|---|---|
| CN | 105138988 A | 12/2015 |
| DE | 102011085578 A1 | 5/2012 |
| EP | 3163420 A1 | 5/2017 |

(Continued)

OTHER PUBLICATIONS

Communication dated Oct. 10, 2017, from the European Patent Office in counterpart European Application No. 17162281.4.

*Primary Examiner* — Daniel Mariam
(74) *Attorney, Agent, or Firm* — Sughrue Mion, PLLC

(57) ABSTRACT

Provided is an electrical device including a display configured to display an image; a first transparent cover arranged on the display; a second transparent cover comprising a touch surface operable to be touched by a finger of a user; and a sensor disposed between the first transparent cover and the second transparent cover, the sensor being configured to receive a fingerprint of the finger.

19 Claims, 14 Drawing Sheets

(56) References Cited

FOREIGN PATENT DOCUMENTS

| | | |
|---|---|---|
| JP | 2002159052 A | 5/2002 |
| KR | 1020120116907 A | 10/2012 |
| KR | 1020150073539 A | 7/2015 |
| KR | 10-2017-0050060 A | 5/2017 |
| WO | 2017/031965 A1 | 3/2017 |

* cited by examiner

ON-SCREEN FINGERPRINT SENSOR AND ELECTRONIC DEVICE INCLUDING THE SAME

CROSS-REFERENCE TO RELATED APPLICATION

This application claims priority from Korean Patent Application No. 10-2016-0053544, filed on Apr. 29, 2016 in the Korean Intellectual Property Office, the disclosure of which is incorporated herein by reference in its entirety.

BACKGROUND

1. Field

Apparatuses and methods consistent with exemplary embodiment relate to recognizing a fingerprint placed on a display screen using an on-screen fingerprint sensor.

2. Description of the Related Art

Needs for personal authentication using personal unique characteristics such as fingerprints, voice, face, hands, irises, or the like have been gradually increasing. Personal authentication is usually used in banking devices, access control systems, mobile devices, laptop computers, etc., and recently, with the wide spread of mobile devices like smartphones, a fingerprint recognition device for personal authentication has been adopted to protect a lot of security information stored in the smartphones.

In the smartphone, a touchscreen device is attached onto a display device to provide an intuitive input means to a user, and generally, a fingerprint recognition device is provided separately from the touchscreen device to recognize a fingerprint only when a particular position is touched thereon.

SUMMARY

One or more exemplary embodiments provide an on-screen fingerprint sensor capable of sensing a fingerprint on a display screen and an electronic device including the on-screen fingerprint sensor.

According to an aspect of an exemplary embodiment, there is provided an electrical device including: a display configured to display an image; a first transparent cover arranged on the display; a second transparent cover comprising a touch surface operable to be touched by a finger of a user; and a sensor disposed between the first transparent cover and the second transparent cover, the sensor being configured to receive a fingerprint of the finger.

The second transparent cover may include reinforced glass, sapphire, or polymer.

The second transparent cover may include a material having a pencil hardness of 9H or higher.

A thickness of the second transparent cover may be less than or equal to about 100 μm.

A thickness of the second transparent cover may be greater than or equal to about 100 μm.

The electrical device may further include at least one inlet pattern that is disposed on an edge of the first transparent cover and connects a wire included in the sensor to a driving circuit.

The sensor may include a plurality of first electrodes arranged in parallel along a first direction and a plurality of second electrodes arranged in parallel along a second direction intersecting the plurality of first electrodes.

The sensor may further include an insulating layer arranged between the plurality of first electrodes and the plurality of second electrodes; and a support layer provided to support the plurality of first electrodes, the insulating layer, and the plurality of second electrodes. The support layer may be adhered to a surface of the first transparent cover that faces the sensor or adhered to an opposite surface to the touch surface of the second transparent cover.

The plurality of second electrodes may be arranged on a surface of the first transparent cover that faces the sensor, and the plurality of second electrodes may be arranged on another surface of the first transparent cover that faces the display.

The sensor may be buried in the second transparent cover.

The plurality of first electrodes or the plurality of second electrodes may be arranged in a position having a distance of about 100 μm or less from the touch surface The plurality of first electrodes and the plurality of second electrodes may have a strip shape having uniform widths and include a metallic material or a transparent electrode material.

The plurality of first electrodes may have a width greater than a width of the plurality of second electrodes when the plurality of first electrodes includes a transparent conductive material and the plurality of second electrodes includes a metallic material.

The plurality of second electrodes may have a width greater than a width of the plurality of first electrodes when the plurality of second electrodes includes a transparent conductive material and the plurality of first electrodes includes a metallic material Each of the plurality of first electrodes and the plurality of second electrodes may have a shape in which a plurality of diamond patterns are connected.

The diamond pattern may include a transparent conductive material.

A bridge pattern including a metallic material may be provided to connect adjacent diamond patterns among the plurality of diamond patterns.

According to an aspect of another exemplary embodiment, there is provided an electrical device including a display configured to display an image, a transparent cover arranged on the display, and a sensor buried in the transparent cover to receive a fingerprint of a finger of a user in response to a surface of the transparent cover being touched by the finger.

The sensor may include including a plurality of first electrodes arranged in parallel along a first direction, a plurality of second electrodes arranged in parallel along a second direction intersecting the plurality of first electrodes, and an insulating layer arranged between the plurality of first electrodes and the plurality of second electrodes.

The plurality of first electrodes or the plurality of second electrodes may be arranged in a position having a distance of about 100 μm or less from the touch surface.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
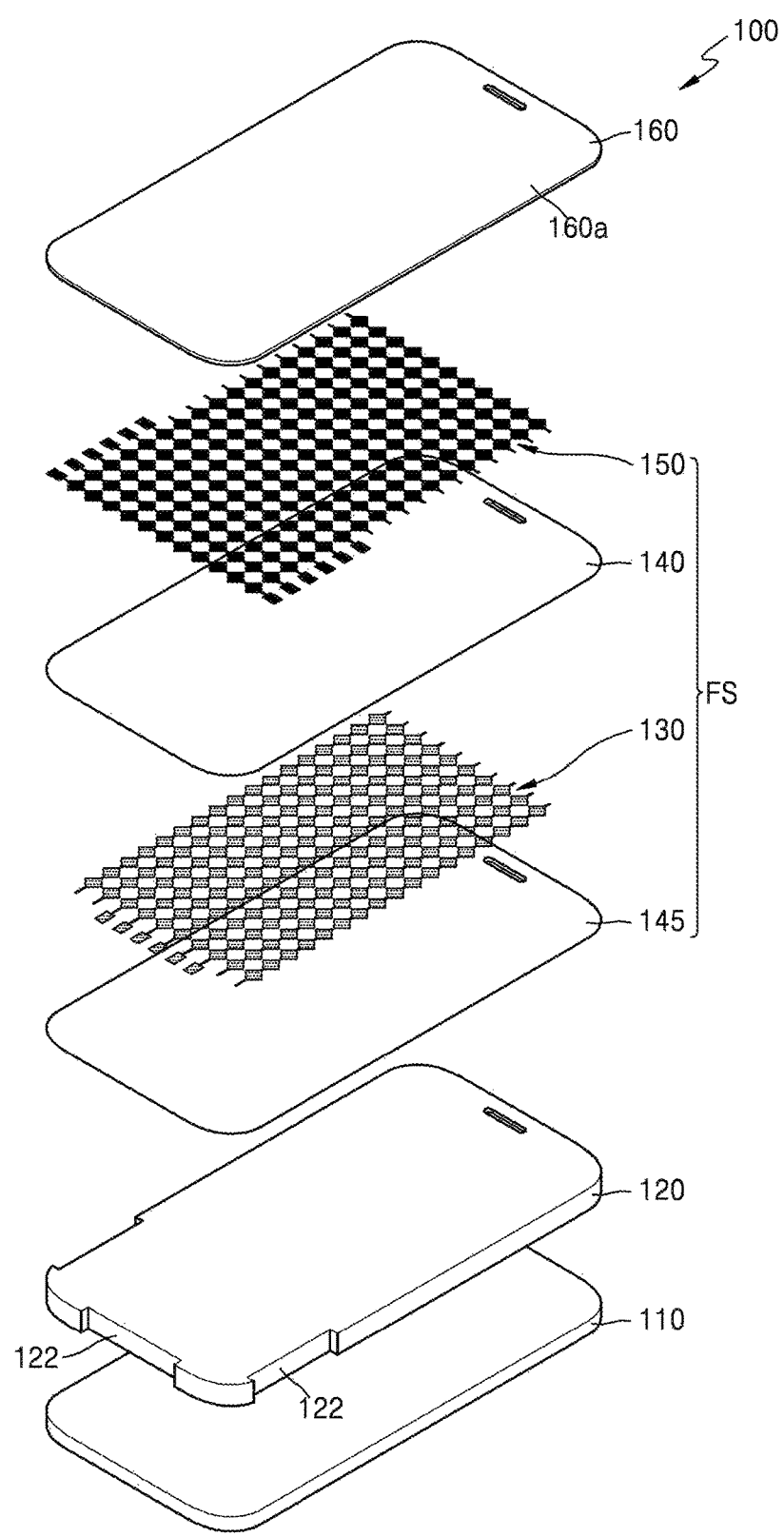
FIG. 1 is an exploded perspective view illustrating a schematic structure of an on-screen fingerprint sensor according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

An expression such as "above" or "on" may include not only the meaning of "immediately on in a contact manner", but also the meaning of "on in a non-contact manner.

Terms such as first, second, and the like may be used to describe various elements, but the elements should not be limited to those terms. These terms may be used for the purpose of distinguishing one element from another element.

The singular forms are intended to include the plural forms as well, unless the context clearly indicates otherwise. If it is assumed that a certain part includes a certain component, the term 'including' means that a corresponding component may further include other components unless a specific meaning opposed to the corresponding component is written.

The term used in the exemplary embodiments such as "unit" or "module" indicates a unit for processing at least one function or operation, and may be implemented in hardware, software, or in a combination of hardware and software.

Figure 2:
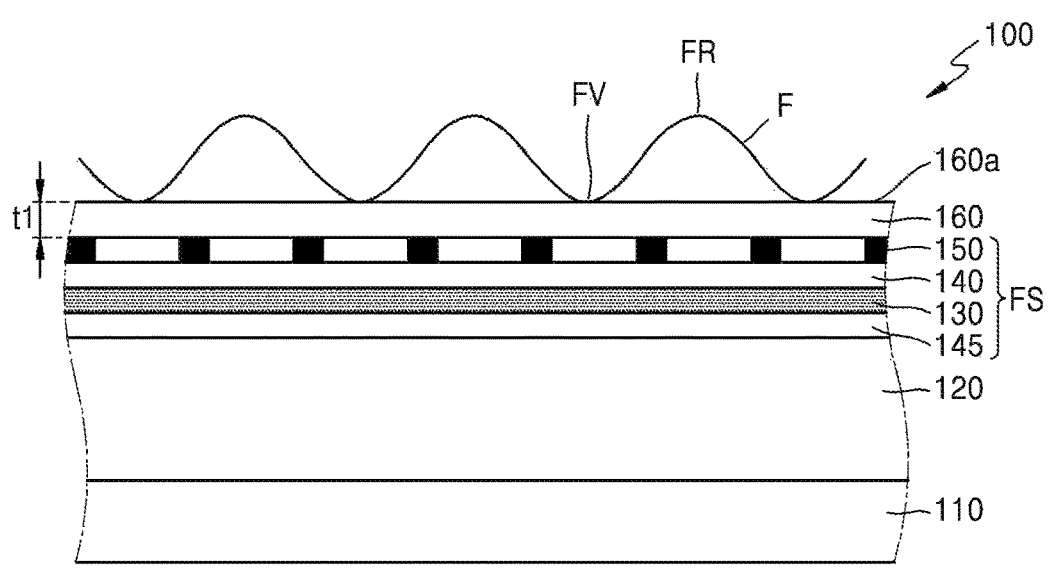
FIG. 2 is a cross-sectional view illustrating an enlarged portion of an on-screen fingerprint sensor of FIG. 1 and a touch by a user's finger on a touch surface.
Figure 3:
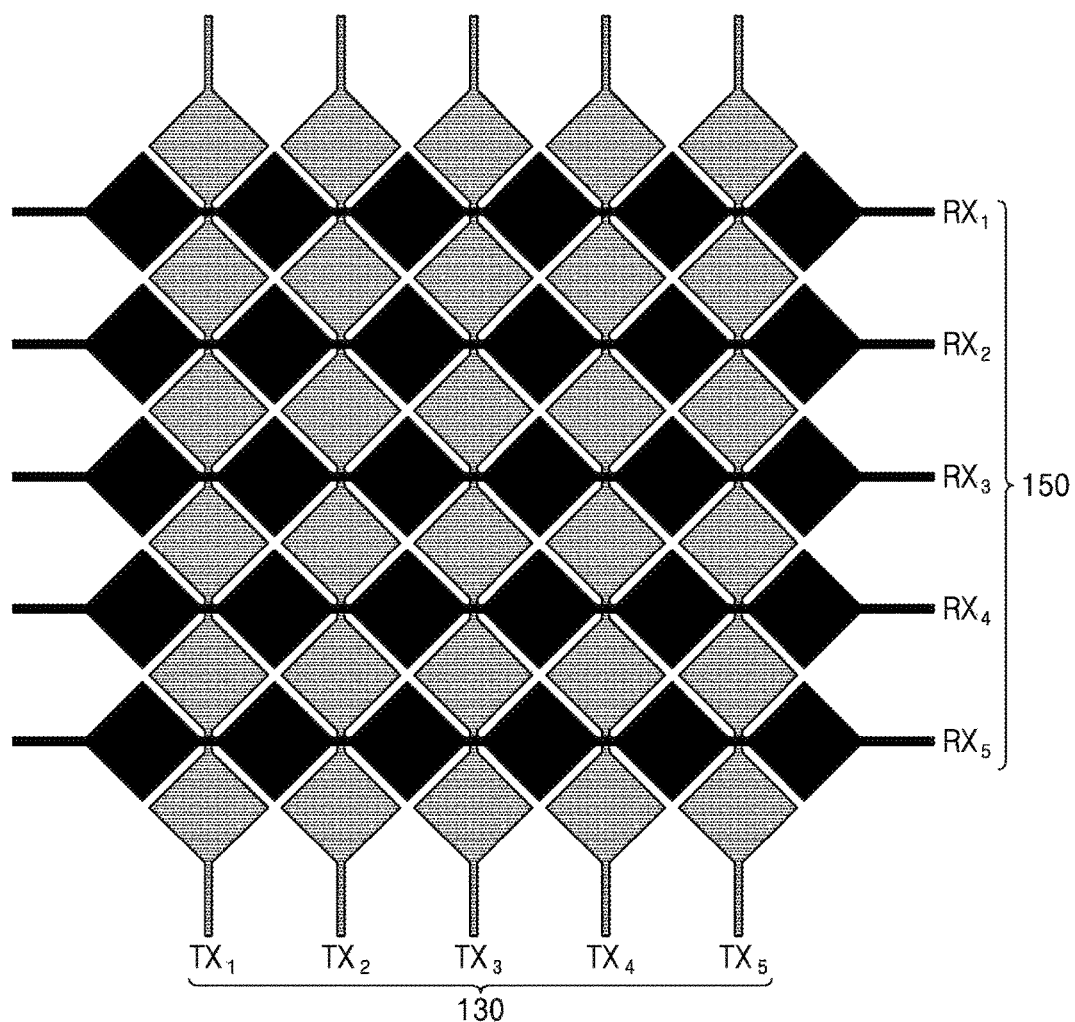
FIG. 3 is a plane view illustrating arrangement of a first electrode unit and a second electrode unit used in an on-screen fingerprint sensor of FIG. 1.

FIG. 1 is an exploded perspective view illustrating a schematic structure of an on-screen fingerprint sensor according to an exemplary embodiment,FIG. 2 is a cross-sectional view illustrating an enlarged portion of the on-screen fingerprint sensor of FIG. 1 and a touch by a user's finger on a touch surface, and FIG. 3 is a plane view illustrating arrangement of a first electrode unit and a second electrode unit used in the on-screen fingerprint sensor of FIG. 1.

Referring to FIGS. 1 through 3, an on-screen fingerprint sensor 100 may include a display device 110 that displays an image, a first transparent cover 120 arranged on the display device 110, a sensor unit FS that is arranged in adjacent to the first transparent cover 120 to sense a user's fingerprint, and a second transparent cover 160 that is arranged on the sensor unit FS and has a touch surface 160a that is touched by the user's fingerprint.

The display device 110 may be an organic light-emitting display (OLED) device or a liquid crystal display (LCD) device.

The first transparent cover 120 arranged on the display device 110 protects the display device 110, and is transparent, and may include reinforced glass, sapphire, polymer, or the like. The first transparent cover 120 may include Gorilla Glass. The first transparent cover 120 comlements strength and hardness of the second transparent cover 160 having a smaller thickness, and to this end, may be thicker than the second transparent cover 160. A thickness of the first transparent cover 120 has a wide range of about 100 μm-20 cm.

Figure 5:
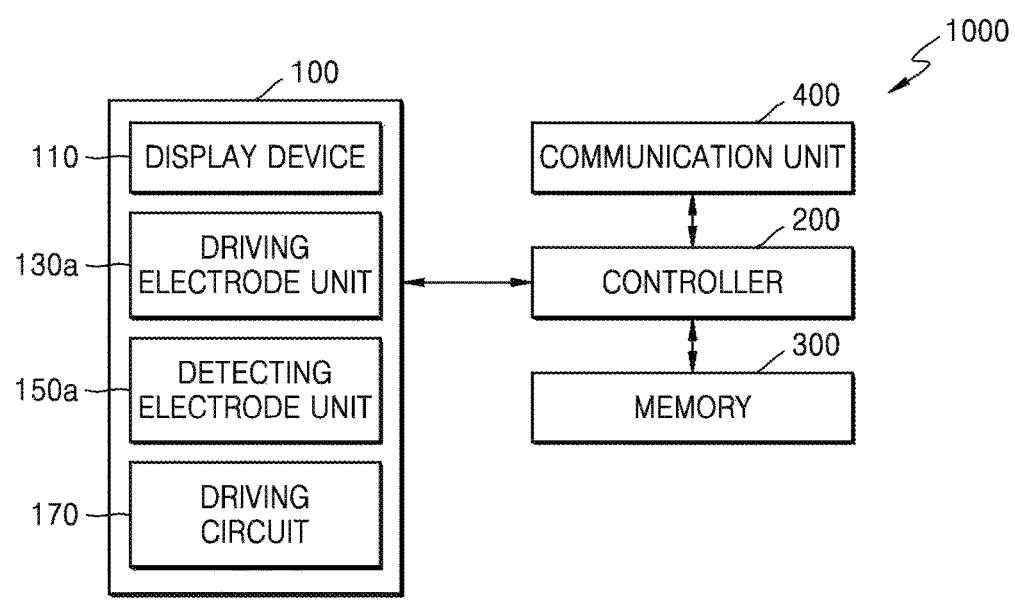
FIG. 5 is a block diagram illustrating a schematic structure of an electronic device including an on-screen fingerprint sensor according to an exemplary embodiment.

On an edge of the first transparent cover 120 may be formed at least one inlet pattern 122 for connecting a wire included in the sensor unit FS to a driving circuit (e.g., a driving circuit 170 shown in FIG. 5). The illustrated shape or position is an example.

The sensor unit FS is disposed on the first transparent cover 120. The sensor unit FS may include a first electrode unit 130 including a plurality of first electrodes $TX_1$ through $TX_5$ arranged in parallel along a direction and a second electrode unit 150 including a plurality of second electrodes $RX_1$ through $RX_5$ arranged in parallel along a direction intersecting, e.g., orthogonal to, the plurality of first electrodes $TX_1$ through $TX_5$. The plurality of first electrodes $TX_1$ through $TX_5$ may be disposed in the same plane. Also, the plurality of second electrodes $RX_1$ through $RX_5$ may be disposed in the same plane.

Each of the first electrodes $TX_1$ through $TX_5$ and the second electrodes $RX_1$ through $RX_5$ may have a shape in which a plurality of diamond patterns are connected. The first electrodes $TX_1$ through $TX_5$ and the second electrodes $RX_1$ through $RX_5$ may include a transparent conductive material (e.g., indium tin oxide (ITO), indium zinc oxide (IZO), zinc oxide (ZnO), indium oxide (In2O3), indium gallium oxide (IGO), aluminium zinc oxide (AZO), or the like). The first electrodes $TX_1$ through $TX_5$ and the second electrodes $RX_1$ through $RX_5$ may also include an organic electrode or a transparent conductive material containing nanowire, nanoparticle, or the like.

The number of first electrodes $TX_1$ through $TX_5$ or the number of second electrodes $RX_1$ through $RX_5$ illustrated in FIG. 3 is an example, and is not limited to this example.

An insulating layer 140 may be arranged between the first electrode unit 130 and the second electrode unit 150. The insulating layer 140 is intended to insulate the first electrode unit 130 and the second electrode unit 150 therebetween, and may include, for example, a polyimide (PI) film. The first electrode unit 130, the insulating layer 140, and the second electrode unit 150 may be arranged sequentially on a support layer 145. The support layer 145 may include a transparent insulating layer such as glass, sapphire, polymer, etc., and serves as a support unit for forming the first electrode unit 130, the insulating layer 140, and the second electrode unit 150. A thickness of the support layer 145 may be less than or equal to about 100 μm. As such, the first electrode unit 130, the insulating layer 140, and the second electrode unit 150 are sequentially formed on the support layer 145, such that the separately provided sensor unit FS is attached onto the first transparent cover 120. That is, the sensor unit FS adheres to the first transparent cover 120 in a way that the support layer 145 contact a top surface of the first transparent cover 120, and then, the first transparent cover 120 to which the sensor unit FS is attached adheres to the second transparent cover 160, such that the illustrated structure is formed.

A position of the support layer 145 may be changed to a position between the second transparent cover 160 and the second electrode unit 150 as well as the illustrated position. The foregoing arrangement is a modified example such that the sensor unit FS is prepared in a form where the second electrode unit 150, the insulating layer 140, and the first electrode unit 130 are sequentially stacked on the support layer 145 and the sensor unit FS is adhered to the second transparent cover 160. That is, after the sensor unit FS is adhered to the second transparent cover 160 in a form where the support layer 145 contacts the other surface of the touch surface 160a, the second transparent cover 160 to which the sensor unit FS is adhered is adhered to the first transparent cover 120.

The support layer 145 may be omitted. For example, the first electrode unit 130, the insulating layer 140, and the second electrode unit 150 may be sequentially formed directly on the first transparent cover 120, and the first transparent cover 120 on which the first electrode unit 130, the insulating layer 140, and the second electrode unit 150 are sequentially formed may be adhered onto the second transparent cover 160. Alternatively, the second electrode unit 150, the insulating layer 140, and the first electrode unit 130 may be sequentially formed directly on the second transparent cover 160, and then the second transparent cover 160 on which the second electrode unit 150, the insulating layer 140, and the second electrode unit 130 are sequentially formed may be adhered onto the first transparent cover 120.

The second transparent cover 160 is disposed on the sensor unit FS. The second transparent cover 160 is transparent, and may include reinforced glass, sapphire, polymer, or the like. The second transparent cover 160 needs to have proper strength and hardness because the second transparent cover 160 protects the sensor unit FS and forms an outermost surface of the on-screen fingerprint sensor 100. Also, the second transparent cover 160 needs to have a thickness for maintaining a proper sensing sensitivity of the sensor unit FS.

The second transparent cover 160 may include a material having a pencil hardness of 9H or higher. A thickness of the second transparent cover 160 may be less than or equal to about 100 μm.

To couple the sensor unit FS to the first transparent cover 120 and the second transparent cover 160, an optical clear adhesive (OCA) may be used.

The on-screen fingerprint sensor 100 is of a capacitance type, and senses a capacitance variation based on a detailed shape of a touched fingerprint. The on-screen fingerprint sensor 100 may function as a touch sensor that determines whether a touch is input by sensing a capacitance variation based on whether the touch is made. A node at which the plurality of first electrodes $TX_1$ through $TX_5$ and the plurality of second electrodes $RX_1$ through $RX_5$ intersect, respectively, may function as a pixel for sensing a touch input or a fingerprint input. That is, at a node at which the plurality of first electrodes $TX_1$ through $TX_5$ and the plurality of second electrodes $RX_1$ through $RX_5$ intersect, respectively, a self-capacitance or a mutual capacitance variation occurs due to a touch input or a fingerprint input, and coordinates of a touch input or an image of a touched fingerprint may be calculated from an electric capacitance variation at a plurality of touched nodes.

A resolution of the on-screen fingerprint sensor 100 is determined by the number of nodes at which the plurality of first electrodes $TX_1$ through $TX_5$ and the plurality of second electrodes $RX_1$ through $RX_5$ intersect. When functioning as a touch sensor, the on-screen fingerprint sensor 100 may be driven at a lower resolution than a resolution in fingerprint sensing. Thus, according to the number of nodes at which a plurality of first electrode groups, each of which formed by grouping a predetermined number of first electrodes from the plurality of first electrodes, and a plurality of second electrode groups, each of which formed by grouping a predetermined number of second electrodes from the plurality of second electrodes, intersect, a resolution for functioning as a touch sensor may be determined.

When a driving signal is applied to the first electrode unit 130, a mutual capacitance is generated between the first electrode unit 130 and the second electrode unit 150. If a finger F contacts the touch surface 160a, a change occurs in a mutual capacitance generated between electrodes positioned adjacent to an area the finger F contacts among multiple electrodes included in the second electrode unit 150 and the first electrode unit 130. The electric capacitance variation differs from an electrode positioned adjacent to a ridge FR of a fingerprint of the finger F to an electrode positioned adjacent to a valley FV of the fingerprint of the finger F. By setting an interval between electrodes included in the second electrode unit 150 (i.e., a detection electrode unit) less than an average interval between a ridge and a valley of a fingerprint, a variation in a mutual capacitance based on a finger situated adjacent to the second electrode unit 150 may be detected in each position and a fingerprint image may be computed.

Although the first electrode unit 130 functions as a driving electrode unit and the second electrode unit 150 functions as a detecting electrode unit in the foregoing description, the present exemplary embodiment is not limited to this example. That is, the second electrode unit 150 may function as a driving electrode unit and the first electrode unit 130 may function as a detecting electrode unit.

The on-screen fingerprint sensor 100 may further include a driving circuit (e.g., a driving circuit 170 shown in FIG. 5) for sensor driving. The driving circuit 170 may include a driving electrode driver for outputting a driving signal and applying the driving signal to the first electrode unit 130, which is a driving electrode unit, a shift register for coarse scanning for touch detection, a demultiplexer (DEMUX) for distributing an output of a touch shift register to the driving electrode driver, a shift register for fine scanning for fingerprint detection, and so forth. The driving circuit 170 may include a multiplexer (MUX) for selecting a particular line of output lines of the first electrode unit 130, a signal amplification circuit stage, a low-frequency pass filter, a MUX for selecting a particular line of output lines of the low-frequency pass filter, and analog-to-digital converter (ADC) for conversion into a digital signal.

In the on-screen fingerprint sensor 100 according to an exemplary embodiment, the first electrode unit 130 and the second electrode unit 150 are arranged on the first transparent cover 120 that protects the display device 110, and the second transparent cover 160 having a thickness less than a thickness of the first transparent cover 120, t1, is arranged on the second electrode unit 150. The thickness t1 may be less than or equal to about 100 μm, e.g., about 50 μm. This arrangement is intended for increasing an electric capacitance variation based on a fingerprint touch, thus improving the sensitivity of fingerprint recognition. As a distance between the area touched by the finger F and the sensor unit FS decreases, the sensitivity of fingerprint recognition may increase.

The on-screen fingerprint sensor 100 is illustrated in the form of a mobile phone in FIG. 1, but the on-screen fingerprint sensor 100 is not limited to this illustration and may be in the form of a watch.

Figure 4:
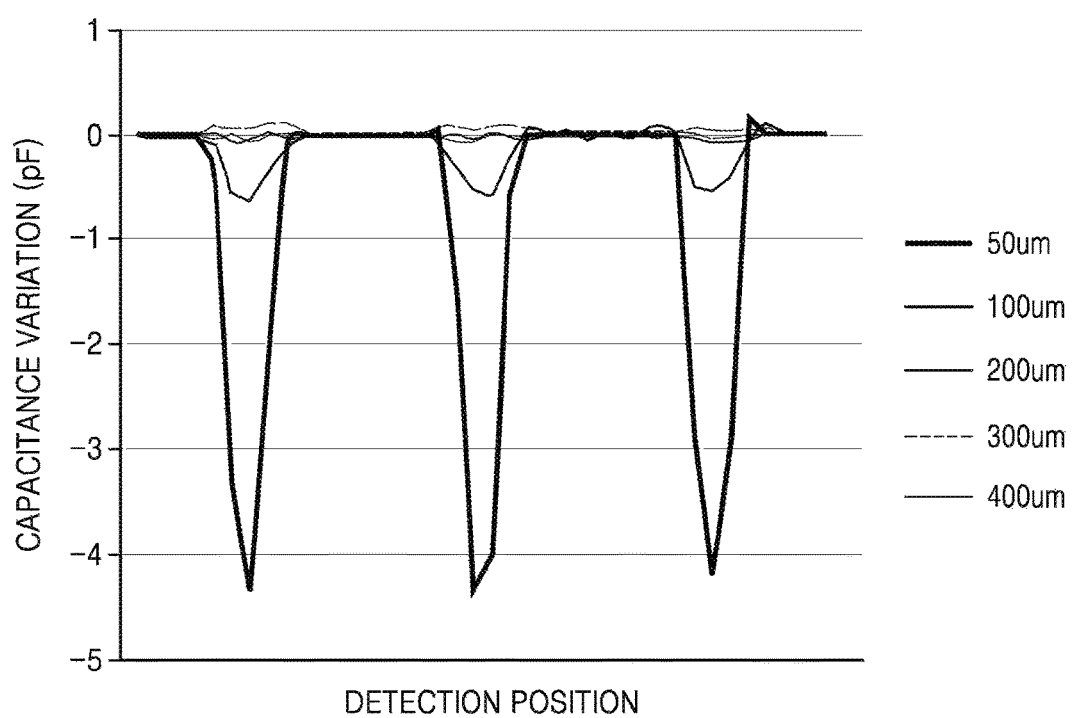
FIG. 4 is a computer simulation graph illustrating a capacitance variation in a valley and a ridge of a fingerprint with respect to a thickness of a second transparent cover on an on-screen fingerprint sensor of FIG. 1.

FIG. 4 is a computer simulation graph illustrating a capacitance variation in a valley and a ridge of a fingerprint with respect to a thickness of the second transparent cover 160 on the on-screen fingerprint sensor 100 of FIG. 1.

A thickness of the second transparent cover 160 corresponds to the distance between the second electrode unit 150 and the touch surface 160a, and this distance directly affects a sensing sensitivity. The graph corresponds to a capacitance variation when the second transparent cover 160 includes glass and has a thickness of about 50 μm to about 400 μm. In the graph, a horizontal axis indicates a detection position and a vertical axis indicates a capacitance variation. A peak of the graph indicates a position of a valley of a fingerprint. That is, the graph shows a relative change of a capacitance based on the valley of the fingerprint with respect to a capacitance based on the ridge of the fingerprint, and as this change increases, the valley and the ridge of the fingerprint may be apparently distinguished.

Referring to the graph, as the thickness of the second transparent cover 160 increases, a capacitance variation based on the ridge and valley decreases. The second transparent cover 160 having a small thickness is favorable to clear distinction between the valley and the ridge of the fingerprint, and when strength and hardness are also considered, the thickness of the second transparent cover 160 may be set to be less than or equal to about 100 μm.

The on-screen fingerprint sensor 100 may show sensing sensitivity improvement. The on-screen fingerprint sensor 100 has a sensing sensitivity that is superior to a conventional structure in which a top surface of thick cover glass having a thickness of about several hundreds of μm to about several mm is a touch surface, under which a sensor unit is arranged. Moreover, since the first transparent cover 120 and the second transparent cover 160 are stacked having the sensor unit FS therebetween, proper strength and hardness may be secured.

FIG. 5 is a block diagram illustrating a schematic structure of an electronic device 1000 including the on-screen fingerprint sensor 100 according to an exemplary embodiment.

The electronic device 1000 may include the on-screen fingerprint sensor 100 and a controller 200 for controlling the on-screen fingerprint sensor 100.

The on-screen fingerprint sensor 100 may include a display device 110, a driving electrode unit 130a, a detecting electrode unit 150a, and a driving circuit 170. The driving electrode unit 130a may correspond to the first electrode unit 130 and the detecting electrode unit 150a may correspond to the second electrode unit 150. However, the present exemplary embodiment is not limited thereto. The driving electrode unit 130a may be implemented by the second electrode unit 150 and the detecting electrode unit 150a may be implemented by the first electrode unit 130

The controller 200 controls the on-screen fingerprint sensor 100 such that a driving signal is applied to the driving electrode unit and an electric signal from the detecting electrode unit is detected. The controller 200 may be implemented by one or more processors. As mentioned above, the on-screen fingerprint sensor 100 may also serve as a touch sensor, and the controller 200 applies a driving signal to a driving electrode unit, and detects an electric signal from the detecting electrode unit. The controller 200 may adjust the driving signal according to a current mode of the electronic device 1000, either a fingerprint sensing mode or a touch sensing mode. For example, the controller 200 may control the on-screen fingerprint sensor 100, such that a separate driving signal is applied to the first electrodes $TX_1$ through $TX_5$ and an electric signal is separately detected from each of the second electrodes $RX_1$ through $RX_5$ in the fingerprint sensing mode. It is not necessary to maintain the same resolution in the touch sensing mode as in fingerprint sensing, such that application of a driving signal to the first electrode unit 130 and detection of an electric signal from the second electrode unit 150 may be performed for detection of a capacitance variation at a low resolution. For example, the plurality of first electrodes $TX_1$ through $TX_5$ may be grouped into a predetermined number of first electrodes for application of the same driving signal to the same group, and the plurality of second electrodes $RX_1$ through $RX_5$ may be grouped into a predetermined number of second electrodes for accumulative detection of electric signals of electrodes in the same group.

The controller 200 may determine whether the current mode is the fingerprint sensing mode or the touch sensing mode. The controller 200 computes the fingerprint image and determines whether to perform authentication based on fingerprint matching in the fingerprint sensing mode, and performs computation of touched coordinates and execution of a command corresponding to a computed position in the touch sensing mode.

The electronic device 1000 may further include a memory 300 and a communication unit (e.g., communication interface) 400.

The memory 300 stores a program for processing and controlling the controller 200. The memory 300 may also store a control program for applying a driving signal to the on-screen fingerprint sensor 100 and analyzing a detection signal and fingerprint data stored in advance for user authentication or a matching program for fingerprint matching.

The memory 300 may include a storage medium of at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and so forth.

The communication unit 400 communicates with an external device by using, but not limited to, Bluetooth communication, Bluetooth low energy (BLE) communication, near field communication (NFC), wireless local area network (WLAN) (e.g., wireless fidelity (WiFi)) communication, Zigbee communication, Infrared Data Association (IrDA) communication, WiFi direct (WFD), ultra wideband (UWB) communication, Ant+ communication, WiFi communication, and the like.

The electronic device 1000 may be, for example, a mobile communication device, a smartphone, a smart watch, and so forth.

Figure 6:
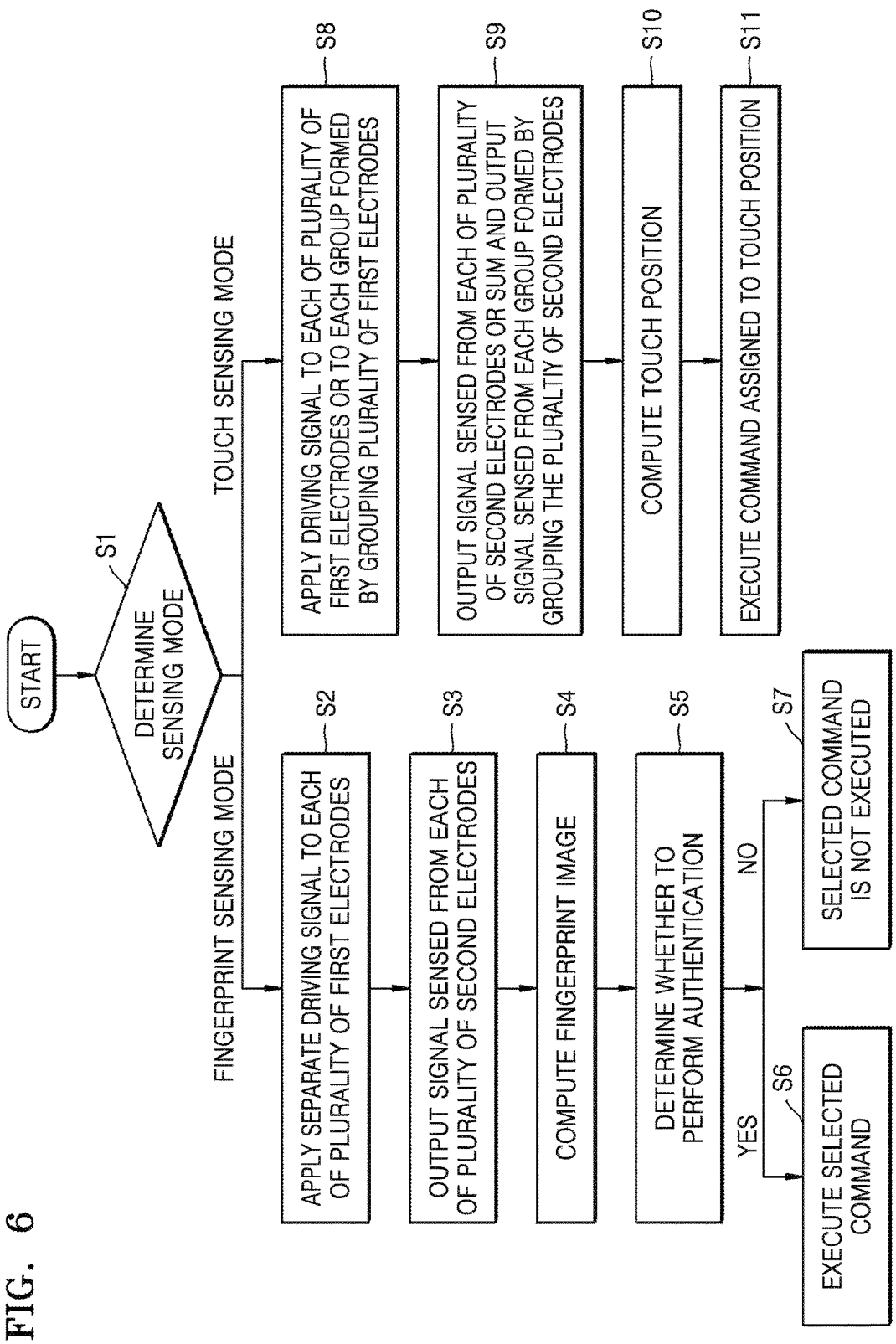
FIG. 6 is a flowchart illustrating an operation of performing fingerprint sensing and/or touch sensing by an electronic device of FIG. 5.

FIG. 6 is a flowchart illustrating an operation of performing fingerprint sensing and/or touch sensing by the electronic device 1000 of FIG. 5.

Referring to FIG. 6, sensing mode determination is performed in operation S1. That is, it is determined whether the on-screen fingerprint sensor 100 is to operate in a fingerprint sensor mode or a touch sensing mode.

If the fingerprint sensing mode is selected, a separate driving signal is applied to a plurality of first electrodes in operation S2 and a signal sensed by each of a plurality of second electrodes is separately output in operation S3. A fingerprint image is computed from the sensed signal in operation S4. It is determined from the computed fingerprint image whether to perform authentication in operation S5. A selected command is executed in operation S6 if it is determined to perform authentication in operation S5. Otherwise, the execution of the selected command is omitted (operation S7).

If the touch sensing mode is selected, a driving signal is applied to each of the plurality of first electrodes or each group formed by grouping the plurality of first electrodes in operation S8, and a signal sensed from each of the plurality of second electrodes is output or an electric signal sensed from electrodes in each group formed by grouping the plurality of second electrodes is summed and output in operation S9. A touch position is computed from the sensed signal in operation S10, and a command assigned to the touch position is executed in operation S11.

Hereinafter, examples of shapes or materials of a first electrode unit and a second electrode unit included in an on-screen fingerprint sensor will be described with reference to FIGS. 7 through 10. The first electrode unit and the second electrode unit may adopt a transparent conductive material and a metallic material together with a proper shape in a range that satisfies a condition that a light transmittance based on a sensor unit and transparent covers maintain about 50% or higher.

Figure 7:
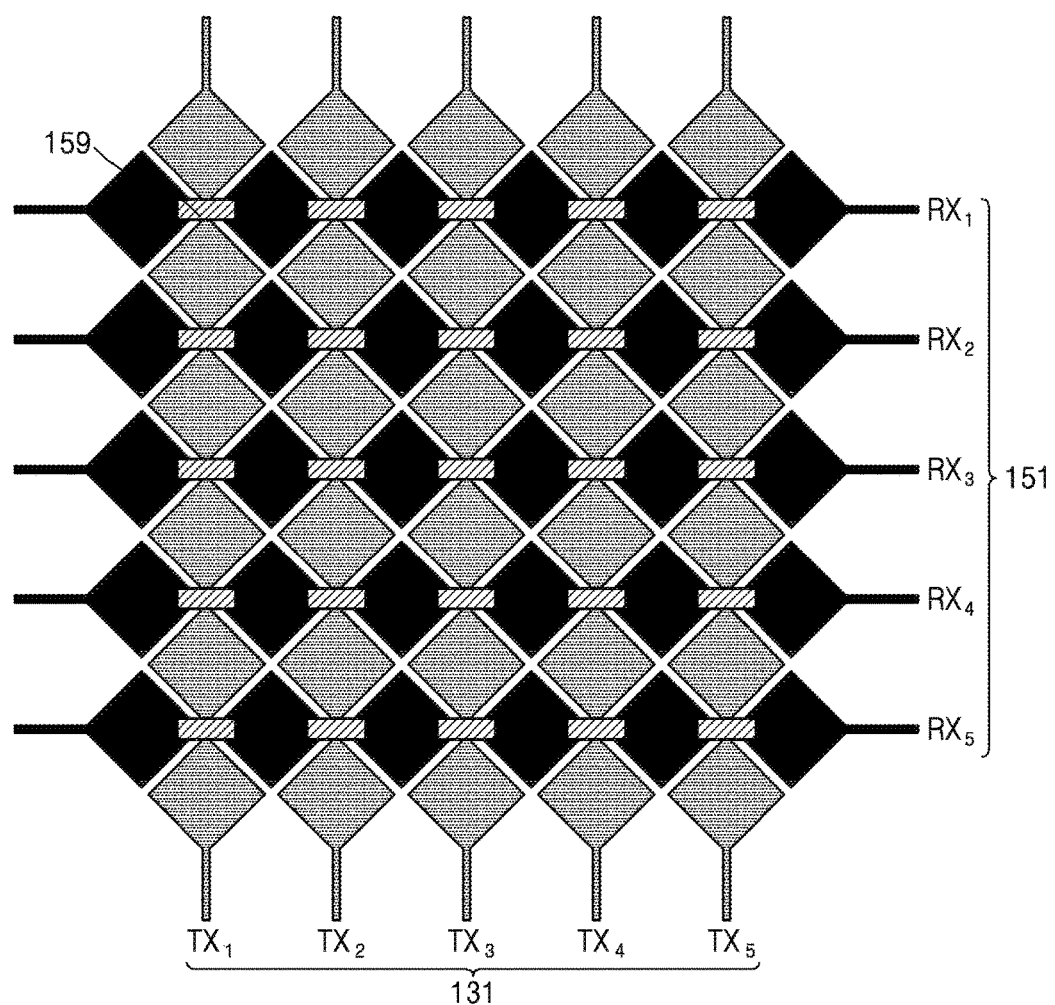
FIG. 7 is a plane view illustrating shapes and arrangement of a first electrode unit and a second electrode unit included in an on-screen fingerprint sensor according to another exemplary embodiment.

FIG. 7 is a plane view illustrating shapes and arrangement of a first electrode unit 131 and a second electrode unit 151 included in an on-screen fingerprint sensor according to another exemplary embodiment.

The first electrode unit 131 may include a plurality of first electrodes $TX_1$ through $TX_5$ arranged such that a plurality of diamond patterns are connected in a direction. The second electrode unit 150 may include a plurality of second electrodes $RX_1$ through $RX_5$ shaped such that a plurality of diamond patterns are arranged in another direction intersecting the direction of the plurality of first electrodes $TX_1$ through $TX_5$ (e.g., in a direction orthogonal to the direction of the plurality of first electrodes $TX_1$ through $TX_5$). The plurality of second electrodes $RX_1$ through $RX_5$ may further include a bridge pattern 159 that connects adjacent diamond patterns. The bridge pattern 159 may include a metallic material. As a connection unit having a relatively small width includes a metallic material having a high conductivity, the electric conductivity may be improved while satisfying a required light transmittance.

Although the bridge pattern 159 is described as being included in the plurality of second electrodes $RX_1$ through $RX_5$, it may also be included in the plurality of first electrodes $TX_1$ through $TX_5$ without being limited to this example.

Figure 8:
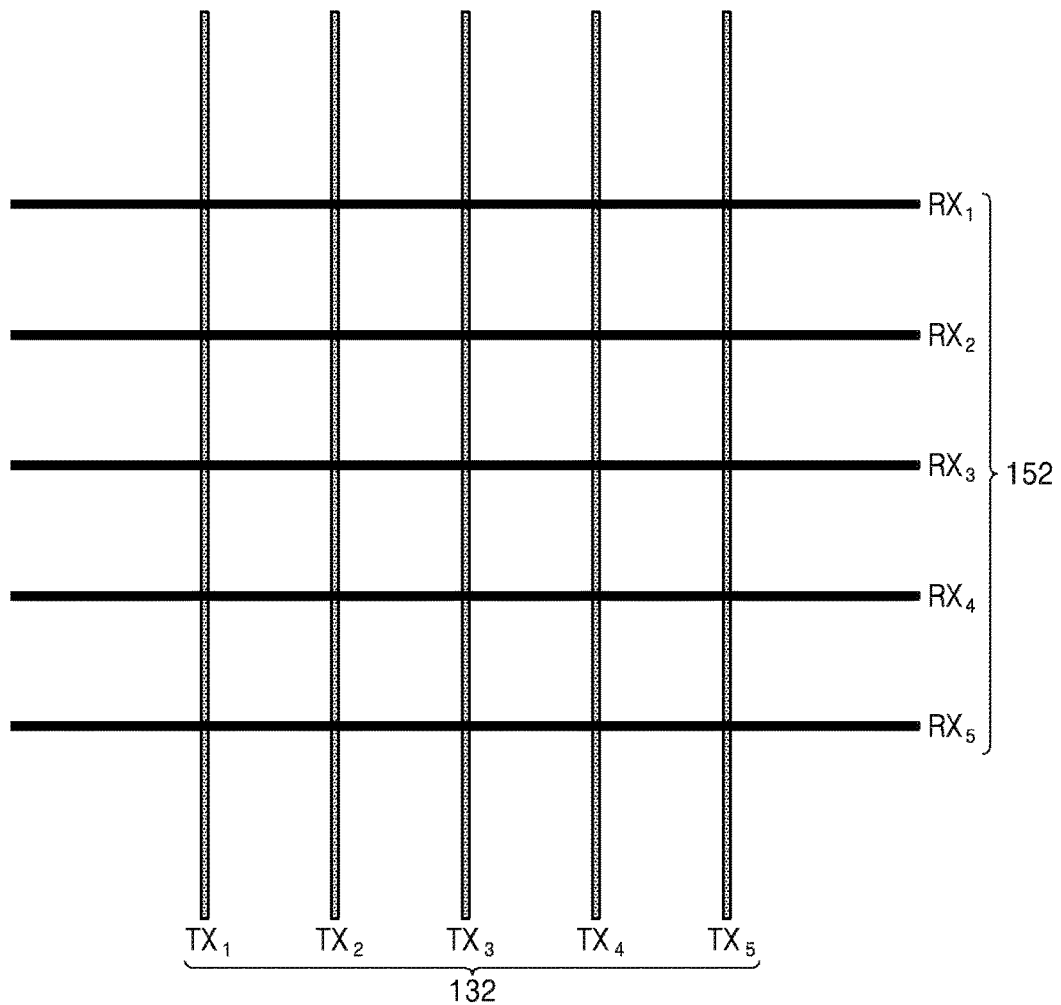
FIG. 8 is a plane view illustrating shapes and arrangement of a first electrode unit and a second electrode unit included in an on-screen fingerprint sensor according to another exemplary embodiment.

FIG. 8 is a plane view illustrating shapes and arrangement of a first electrode unit 132 and a second electrode unit 152 included in an on-screen fingerprint sensor according to another exemplary embodiment.

A plurality of first electrodes $TX_1$ through $TX_5$ and a plurality of second electrodes $RX_1$ through $RX_5$ included in the first electrode unit 132 and the second electrode unit 152 are arranged in a metallic mesh form.

The first electrode unit 131 may include the plurality of first electrodes $TX_1$ through $TX_5$ in a wire shape extending in a direction, and the second electrode unit 150 may include the plurality of second electrodes $RX_1$ through $RX_5$ in a wire shape extending in another direction intersecting the direction of the plurality of first electrodes $TX_1$ through $TX_5$ (e.g., in a direction orthogonal to the direction of the plurality of first electrodes $TX_1$ through $TX_5$). The plurality of first electrodes $TX_1$ through $TX_5$ and the plurality of second electrodes $RX_1$ through $RX_5$ may have a width of about 7 μm or less, respectively, and may include a metallic material. Examples of the metallic material may include a conductive metallic material or a metallic alloy, such as Pt, Ru, Au, Ag, Mo, Al, W, Pd, Mg, Ni, Nd, Ir, Cr, Ti, Cu, or the like.

The metallic material may not pass light therethrough, such that a thickness and the number of wires of the first electrodes $TX_1$ through $TX_5$ and the second electrodes $RX_1$ through $RX_5$ may be properly set to obtain a light transmittance of about 50% or more based on the sensor unit and the transparent covers.

Figure 9:
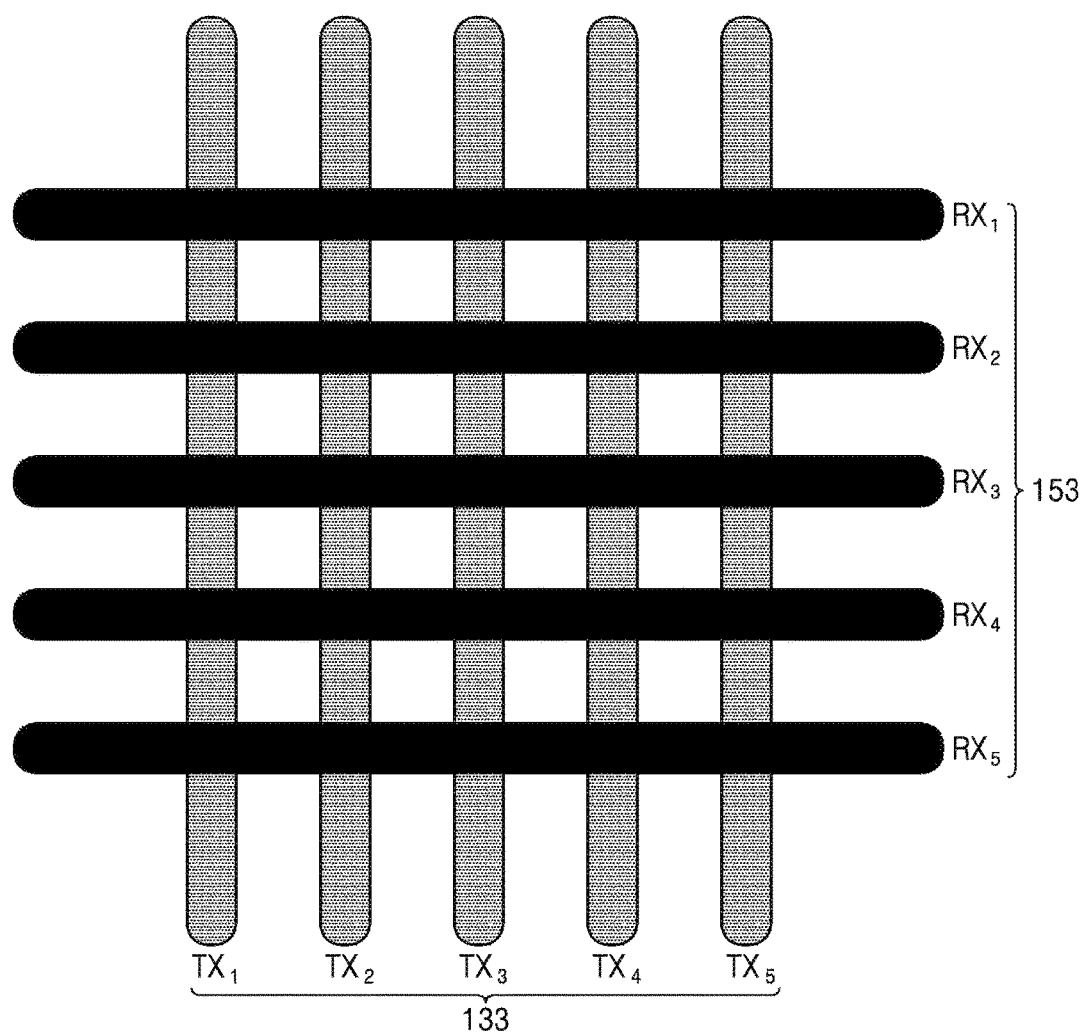
FIG. 9 is a plane view illustrating shapes and arrangement of a first electrode unit and a second electrode unit included in an on-screen fingerprint sensor according to another exemplary embodiment.

FIG. 9 is a plane view illustrating shapes and arrangement of a first electrode unit 133 and a second electrode unit 153 included in an on-screen fingerprint sensor according to another exemplary embodiment.

The first electrode unit 133 may include the plurality of first electrodes $TX_1$ through $TX_5$ in a strip shape extending in a direction, and the second electrode unit 153 may include the plurality of second electrodes $RX_1$ through $RX_5$ in a strip shape extending in another direction intersecting the direction of the plurality of first electrodes $TX_1$ through $TX_5$ (e.g., in a direction orthogonal to the direction of the plurality of first electrodes $TX_1$ through $TX_5$). The plurality of first electrodes $TX_1$ through $TX_5$ and the plurality of second electrodes $RX_1$ through $RX_5$ may include a transparent conductive material.

Although the first electrodes $TX_1$ through $TX_5$ and the second electrodes $RX_1$ through $RX_5$ are illustrated as having an identical width, they may also have different widths.

Figure 10:
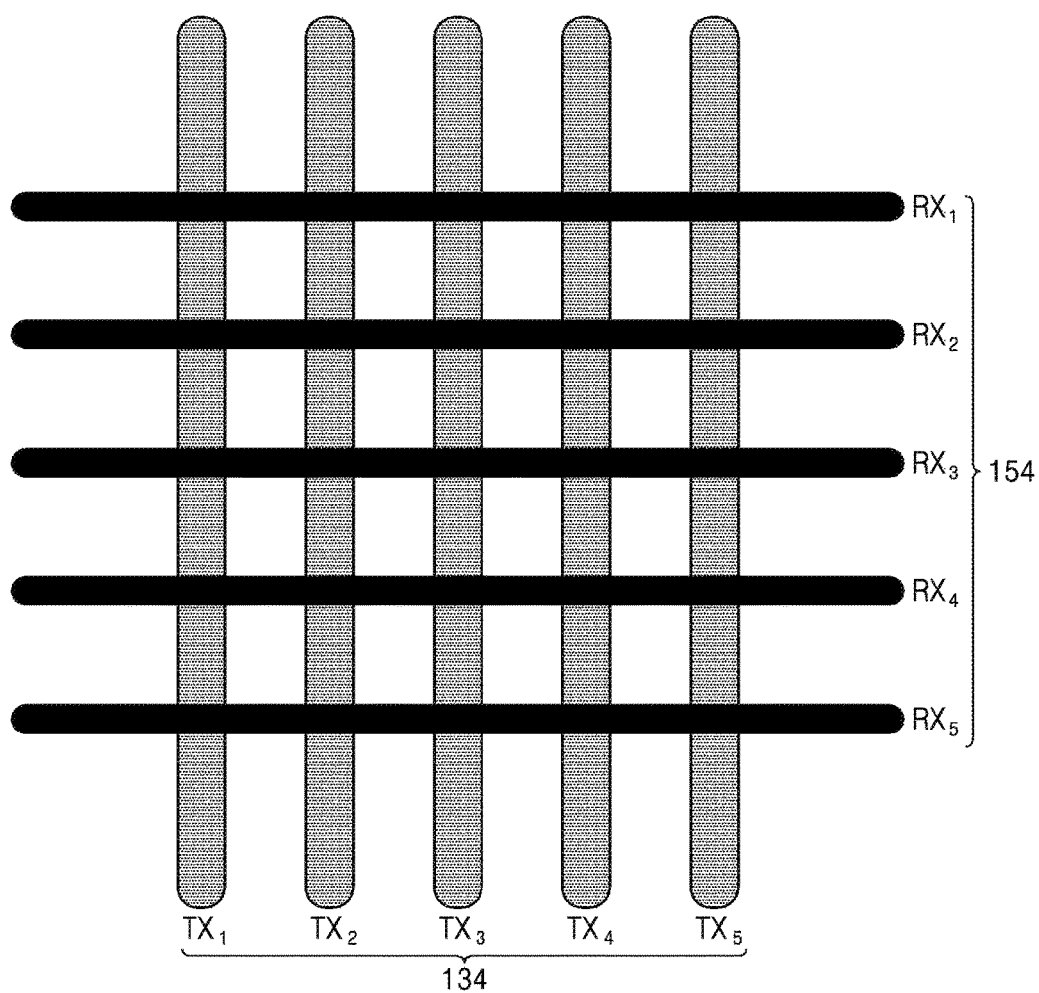
FIG. 10 is a plane view illustrating shapes and arrangement of a first electrode unit and a second electrode unit included in an on-screen fingerprint sensor according to another exemplary embodiment.

FIG. 10 is a plane view illustrating shapes and arrangement of a first electrode unit 134 and a second electrode unit 154 included in an on-screen fingerprint sensor according to another exemplary embodiment.

The first electrode unit 134 may include the plurality of first electrodes $TX_1$ through $TX_5$ in a strip shape extending in a direction, and the second electrode unit 154 may include the plurality of second electrodes $RX_1$ through $RX_5$ in a strip shape extending in another direction intersecting the direction of the plurality of first electrodes $TX_1$ through $TX_5$ (e.g., in a direction orthogonal to the direction of the plurality of first electrodes $TX_1$ through $TX_5$). The first electrodes $TX_1$ through $TX_5$ and the second electrodes $RX_1$ through $RX_5$ have different widths, and the plurality of first electrodes $TX_1$ through $TX_5$ having a wide width may include a transparent conductive material and the plurality of second electrodes $RX_1$ through $RX_5$ having a narrow width may include a metallic material or a metallic alloy.

In the current exemplary embodiment, a width of electrodes of the first electrode unit 130, which is a driving electrode unit, is wider than electrodes of the second electrode unit 150, which is a detecting electrode unit, to maximize a strength of an electric field formed by a driving signal and thus to improve a sensitivity in which a capacitance variation based on a touch is detected as an electric signal from the second electrode unit 150.

In the current exemplary embodiment, the first electrode unit 130 is assumed to be a driving electrode unit and the second electrode unit 150 is assumed to be a detecting electrode unit, and if the second electrode unit 150 is a driving electrode unit and the first electrode unit 130 is a detecting electrode unit, a width of the second electrode unit 150 may be wider than a width of the first electrode unit 130.

Figure 11:
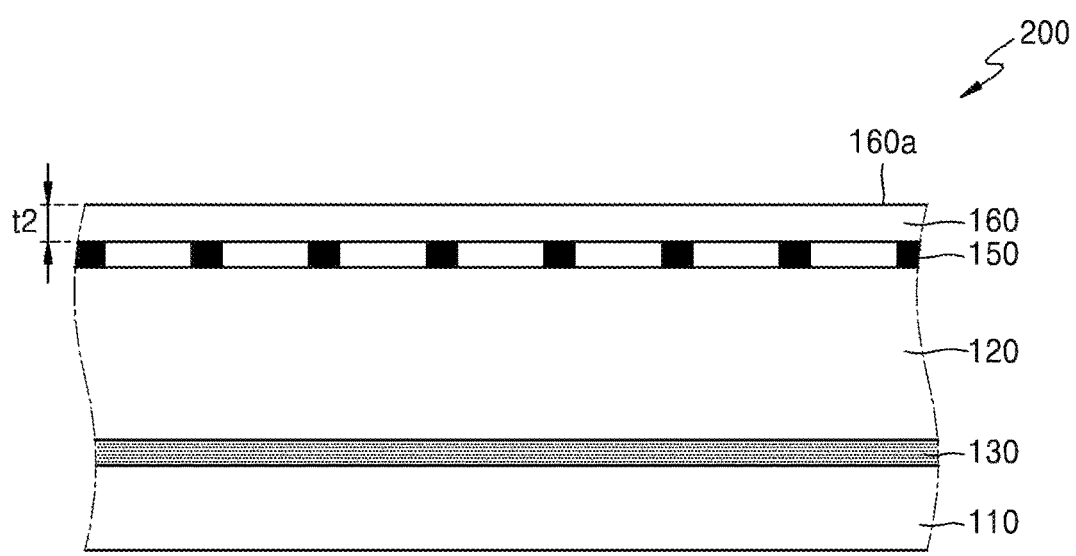
FIG. 11 is a cross-sectional view illustrating a schematic structure of an on-screen fingerprint sensor according to another exemplary embodiment.
Figure 12:
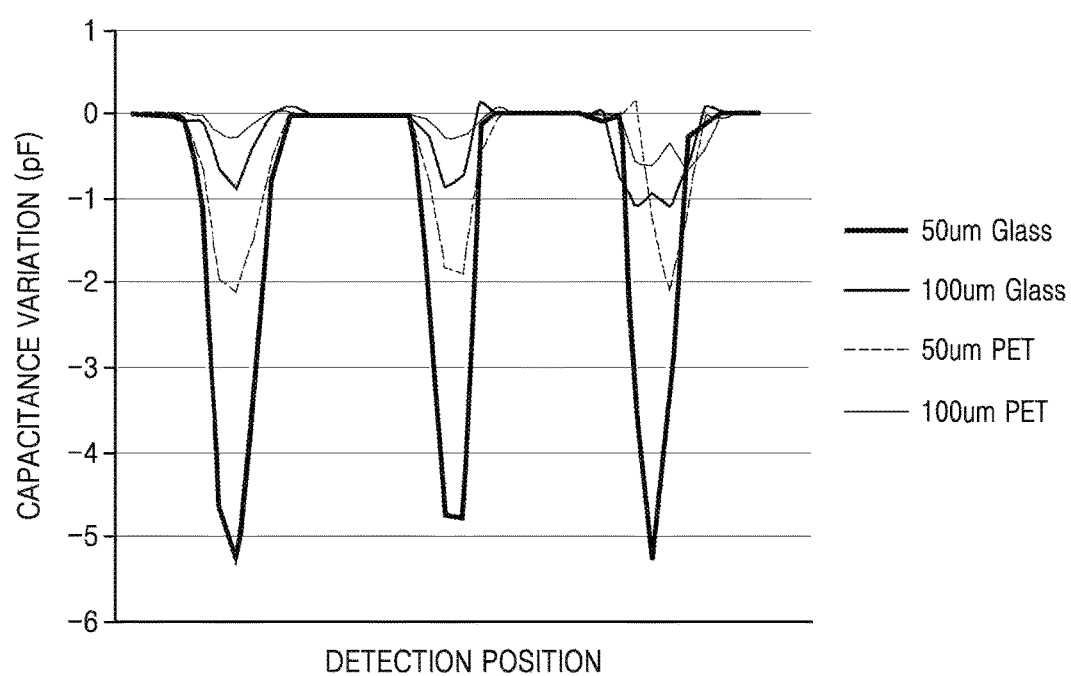
FIG. 12 is a computer simulation graph illustrating a capacitance variation in a valley and a ridge of a fingerprint with respect to a thickness of a second transparent cover on an on-screen fingerprint sensor of FIG. 11.

FIG. 11 is a cross-sectional view illustrating a schematic structure of an on-screen fingerprint sensor 200 according to another exemplary embodiment. FIG. 12 is a computer simulation graph illustrating a capacitance variation in a valley and a ridge of a fingerprint with respect to a thickness of the second transparent cover 160 on the on-screen fingerprint sensor 200 of FIG. 11.

The on-screen fingerprint sensor 200 is different from the on-screen fingerprint sensor 100 of FIG. 1 in a sense that the first electrode unit 130 and the second electrode unit 150 of the sensor unit are arranged on opposite surfaces of the first transparent cover 120. The surfaces of the first transparent cover 120 may include a first surface facing the display device 110 and a second surface facing the first surface, such that the first electrode unit 130 may be arranged on the first surface and the second electrode unit 150 may be arranged on the second surface.

A thickness t2 of the second transparent cover 160 arranged on the second electrode unit 150 corresponds to a distance between the touch surface 160a and the second electrode unit 150, and directly affects a sensing sensitivity. The thickness t2 of the second transparent cover 160 may be set to about 100 μm or less, considering proper sensing sensitivity, strength, and hardness.

FIG. 12 is a computer simulation graph illustrating a capacitance variation in a valley and a ridge of a fingerprint with respect to a thickness of the second transparent cover 160 on the on-screen fingerprint sensor 200 of FIG. 11.

The graph shows a capacitance variation with respect to two thicknesses, 50 μm and 100 μm, when a material of the second transparent cover 160 is glass and polyethylene terephthalate (PET). In the graph, a horizontal axis indicates a detection position and a vertical axis indicates a capacitance variation. A peak of the graph indicates a position of a valley of a fingerprint. That is, the graph shows a relative variation of a capacitance in an electrode positioned adjacent to the valley of the fingerprint with respect to a capacitance in an electrode positioned adjacent to the ridge of the fingerprint, and as this change increases, the valley and the ridge of the fingerprint may be apparently distinguished.

Referring to the graph, as the thickness of the second transparent cover 160 increases, a capacitance variation based on the ridge and valley decreases. If the second transparent cover 160 has a high dielectric constant, the foregoing capacitance variation is large. The capacitance variation is large for the glass material having a dielectric constant of 7.8 when compared to for the PET material having a dielectric constant of 3.

The second transparent cover 160 having a small thickness is favorable to clear distinction between the valley and the ridge of the fingerprint, and when strength and hardness are also considered, the thickness of the second transparent cover 160 may be set to be less than or equal to about 100 μm.

Figure 13:
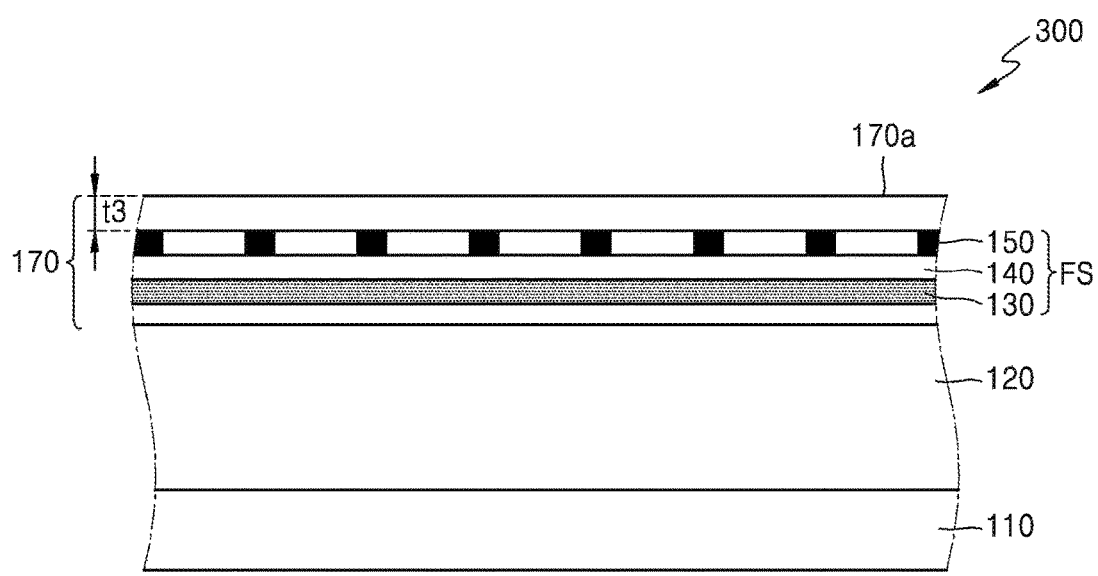
FIG. 13 is a cross-sectional view illustrating a schematic structure of an on-screen fingerprint sensor according to another exemplary embodiment.

FIG. 13 is a cross-sectional view illustrating a schematic structure of an on-screen fingerprint sensor 300 according to another exemplary embodiment.

The on-screen fingerprint sensor 300 according to the current exemplary embodiment is different from the on-screen fingerprint sensor 100 of FIG. 1 in a sense that the sensor unit FS is buried in the second transparent cover 170.

The second transparent cover 170 in which the sensor unit FS is buried is formed, and then the first transparent cover 120 and the second transparent cover 170 are adhered using an optical clear adhesive (OCA). A position of the sensor unit FS in the second transparent cover 170 may be determined such that the distance between the touch surface 170a and the second electrode unit 150, t3, is less than or equal to about 100 μm.

Figure 14:
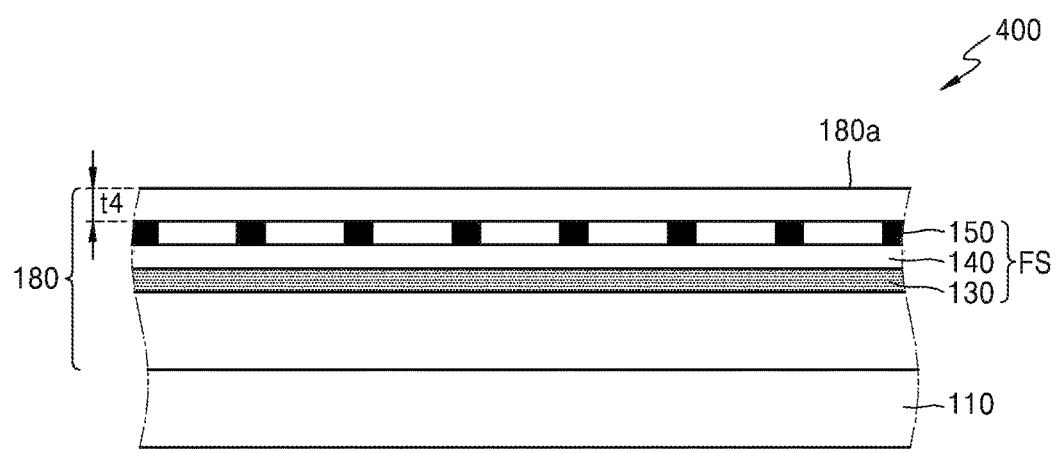
FIG. 14 is a cross-sectional view illustrating a schematic structure of an on-screen fingerprint sensor according to another exemplary embodiment.

FIG. 14 is a cross-sectional view illustrating a schematic structure of an on-screen fingerprint sensor 400 according to another exemplary embodiment.

The on-screen fingerprint sensor 400 according to the current exemplary embodiment is different from the on-screen fingerprint sensor 100 of FIG. 1 in a sense that the sensor unit FS is buried in a transparent cover 180.

That is, the sensor unit FS is buried in the transparent cover 180, such as cover glass having a thickness of generally, several hundreds of μm to several mm, provided on the display device 110 to protect the display device 110, and the transparent cover 180 in which the sensor unit FS is buried is arranged on the display device 110.

A position of the sensor unit FS in the transparent cover 180 may be determined such that a distance t4 between the touch surface 180a and the second electrode unit 150 is less than or equal to about 100 μm.

The above-described on-screen fingerprint sensor has transparent characteristics and thus may be adopted on a front surface of the display.

The on-screen fingerprint sensor may also function as a touch sensor.

The on-screen fingerprint sensor has improved sensing sensitivity while having proper strength and hardness.

The on-screen fingerprint sensor is applicable to various electric devices, e.g., smartphones, smart watches, and so forth.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. An electrical device comprising:
a display configured to display an image;
a first transparent cover arranged on the display;

a second transparent cover comprising a touch surface operable to be touched by a finger of a user; and a sensor disposed between the first transparent cover and the second transparent cover, the sensor being configured to receive a fingerprint of the finger and comprising:

a plurality of first electrodes arranged in a first direction; and plurality of second electrodes arranged in a second direction that is perpendicular to the first direction, so that the plurality of first electrodes and the plurality of second electrodes are alternately arranged in a diagonal direction, wherein each of the plurality of first electrodes and each of the plurality of second electrodes has a uniform size.

2. The electrical device of claim 1, wherein the second transparent cover comprises reinforced glass, sapphire, or polymer.

3. The electrical device of claim 1, wherein the second transparent cover comprises a material having a pencil hardness of 9H or higher.

4. The electrical device of claim 1, wherein the second transparent cover has a thickness of 100 μm or less.

5. The electrical device of claim 1, wherein the first transparent cover has a thickness of 100 μm or more.

6. The electrical device of claim 1, further comprising at least one inlet pattern that is disposed on an edge of the first transparent cover and connects a wire included in the sensor to a driving circuit.

7. The electrical device of claim 1, wherein the sensor comprises:

an insulating layer arranged between the plurality of first electrodes and the plurality of second electrodes; and a support layer provided to support the plurality of first electrodes, the insulating layer, and the plurality of second electrodes, wherein the support layer is adhered to a surface of the first transparent cover that faces the sensor or adhered to an opposite surface to the touch surface of the second transparent cover.

8. The electrical device of claim 1, wherein the plurality of second electrodes is arranged on a surface of the first transparent cover that faces the sensor, and the plurality of second electrodes is arranged on another surface of the first transparent cover that faces the display.

9. The electrical device of claim 1, wherein the sensor is buried in the second transparent cover.

10. The electrical device of claim 9, wherein the plurality of first electrodes or the plurality of second electrodes is arranged in a position having a distance of about 100 μm or less from the touch surface.

11. The electrical device of claim 1, wherein the plurality of first electrodes and the plurality of second electrodes have a strip shape having uniform widths and comprise a metallic material or a transparent electrode material.

12. The electrical device of claim 1, wherein the plurality of first electrodes has a width greater than a width of the plurality of second electrodes, the plurality of first electrodes comprises a transparent conductive material, and the plurality of second electrodes comprises a metallic material.

13. The electrical device of claim 1, wherein the plurality of second electrodes has a width greater than a width of the plurality of first electrodes, the plurality of second electrodes comprises a transparent conductive material and the plurality of first electrodes comprises a metallic material.

14. The electrical device of claim 1, wherein each of the plurality of first electrodes and the plurality of second electrodes has a shape in which a plurality of diamond patterns are connected.

15. The electrical device of claim 14, wherein the plurality of diamond patterns comprises a transparent conductive material.

16. The electrical device of claim 15, wherein a bridge pattern comprising a metallic material is provided to connect adjacent diamond patterns among the plurality of diamond patterns.

17. An electrical device comprising:

a display configured to display an image;

a transparent cover arranged on the display; and a sensor buried in the transparent cover, the sensor being configured to receive a fingerprint of a finger of a user in response to a surface of the transparent cover being touched by the finger, and comprising:

a plurality of first electrodes arranged in a first direction; and a plurality of second electrodes arranged in a second direction that is perpendicular to the first direction, so that the plurality of first electrodes and the plurality of second electrodes are alternately arranged in a diagonal direction, wherein each of the plurality of first electrodes and each of the plurality of second electrodes has a uniform size.

18. The electrical device of claim 17, wherein the sensor further comprises:

an insulating layer arranged between the plurality of first electrodes and the plurality of second electrodes.

19. The electrical device of claim 17, wherein the plurality of first electrodes or the plurality of second electrodes is arranged in a position having a distance of about 100 μm or less from the surface of the transparent cover.

* * * * *